US011064444B2

(12) United States Patent
Al-Mufti et al.

(10) Patent No.: US 11,064,444 B2
(45) Date of Patent: Jul. 13, 2021

(54) METHOD AND SYSTEM FOR GENERATING A MOVE LIST

(71) Applicant: CommScope Technologies LLC, Hickory, NC (US)

(72) Inventors: Khalid W. Al-Mufti, Sterling, VA (US); Navin Srinivasan, Fairfax, VA (US); Ariful Hannan, Sterling, VA (US)

(73) Assignee: CommScope Technologies LLC, Hickory, NC (US)

(*) Notice: Subject to any disclaimer, the term of this patent is extended or adjusted under 35 U.S.C. 154(b) by 92 days.

(21) Appl. No.: 16/383,718

(22) Filed: Apr. 15, 2019

(65) Prior Publication Data

US 2019/0357155 A1    Nov. 21, 2019

Related U.S. Application Data

(60) Provisional application No. 62/672,429, filed on May 16, 2018.

(51) Int. Cl.
*H04W 52/24* (2009.01)
*H04W 52/38* (2009.01)
*H04B 7/06* (2006.01)
*H04W 52/52* (2009.01)
*H04W 52/36* (2009.01)

(52) U.S. Cl.
CPC ........ *H04W 52/243* (2013.01); *H04B 7/0632* (2013.01); *H04B 7/0639* (2013.01); *H04W 52/365* (2013.01); *H04W 52/386* (2013.01); *H04W 52/52* (2013.01)

(58) Field of Classification Search
CPC . H04W 52/243; H04W 52/386; H04W 52/52; H04W 52/365; H04W 52/225; H04W 52/42; H04B 7/0632; H04B 7/0639; H04B 7/0617
See application file for complete search history.

(56) References Cited

U.S. PATENT DOCUMENTS 10,827,444 B2 * 11/2020 Hannan ............... H04W 52/242
2020/0162929 A1 * 5/2020 Cimpu ................ H04W 52/367

OTHER PUBLICATIONS

Drocella et al., "3.5 GHz Exclusion Zone Analyses and Methodology", National Telecommunications and Information Administration, NTIA Report 15-517, Jun. 2015, pp. 1-103, U.S. Department of Commerce.

(Continued)

*Primary Examiner* — Yuwen Pan
*Assistant Examiner* — Fatuma G Sherif
(74) *Attorney, Agent, or Firm* — Fogg & Powers LLC

(57) ABSTRACT

A method is provided. The method comprises: selecting a new protection point in a dynamic protection area; creating an initial sort list of radios; determining look angles; determining which look angle includes most radios in its main beam; determining a modified sort list and an initial move list for the determined look angle; determining a certain percentile of aggregate interference power spectral density at the new protection point for radios that are in a main beam for each of remaining look angles; sorting, by level of certain percentile of aggregate interference power spectral density, the remaining look angles; and generating a move list of radios.

23 Claims, 6 Drawing Sheets

(56) References Cited

OTHER PUBLICATIONS

Hufford, "The ITS Irregular Terrain Model, version 1.2.2 The Algorithm", National Telecommunications and Information Administration, Institute for Telecommunication Sciences, 2002, pp. 1-18, Boulder, CO.

Wif, "Requirements for Commercial Operation in the U.S. 3550-3700 MHz Citizens Broadband Radio Service Band", Working Document WINNF-TS-0112 Version V1.4.1, Jan. 16, 2018, pp. 1-77, The Software Defined Radio Forum Inc.

\* cited by examiner

METHOD AND SYSTEM FOR GENERATING A MOVE LIST

CROSS-REFERENCE TO RELATED APPLICATIONS

The present application claims benefit of U.S. patent application Ser. No. 62/672,429, filed May 16, 2018; the entire contents of the aforementioned patent application are incorporated herein by reference as if set forth in its entirety.

BACKGROUND

Spectrum Access Systems (SASs) are being developed to provide services in frequency spectrum shared with other communications systems. Each spectrum access system regulates transmission of Citizens Broadband Radio Service Devices (CBSDs) that form part of a citizens broadband radio system (CBRS) that incorporates at least one SAS. A SAS is responsible for managing CBSD power levels to minimize signal interference to other users including other CBSDs.

CBSDs of a CBRS (including a SAS controller) may operate in frequency spectrum which is sometimes, or dynamically, utilized by land based or sea based government communications systems, such as ship borne or land based radar. For example, a naval ship may utilize radar proximate, e.g. 15 to 350 miles from shore. As a result, land based CBSDs may interfere with radar return signals by generating aggregate interference at or above a power spectral density threshold, e.g. −144 dBm/10 MHz for some ship borne radar. Different types of government communications systems can have different power spectral density thresholds. Communications systems, e.g. government communications systems, include at least one receiver, a transmitter and a receiver, and/or a transceiver. For pedagogical reasons, government communications systems shall hereafter be exemplified as radars.

The region in which such government communications systems may be dynamically utilized is called a dynamic protection area (DPA). Each DPA may be comprised of a grid of points, e.g. separated by fifty meters, which are also known as protection points (PP). A DPA may have millions, e.g. seven million, protection points.

Because operation of government communications systems has priority over CBSDs, the SAS must ensure that when a government communications system operates that the maximum aggregate interference generated by the CBSDs in the neighborhood of a DPA (where an operating government communications system is located) is below the corresponding power spectral density threshold. To do so, the SAS may have to terminate operation, in the shared frequency spectrum, of one or more CBSDs that contribute to the aggregate interference at a government communications system.

Operation of government communications systems may be detected by an environmental sensing capability (ESC) system. Although the ESC system detects operation of a government communications system, it does not typically know the location of the government communications system, e.g. radar on a naval ship, which the government may prefer to remain concealed.

Because the CBSDs which contribute to the aggregate interference may vary over time, the SAS must continually determine which contributing CBSDs operation in the shared frequency spectrum should be terminated. Because a DPA typically has millions of protection points, the computation to facilitate this determination is undesirably intensive. The computation can overwhelm the processing resources of the SAS. Further, the time required to make the determination is substantial. Therefore, there is a need to reduce the computational intensity and decrease computation time.

SUMMARY OF THE INVENTION

A method is provided. The method comprises: selecting a new protection point in a dynamic protection area; creating an initial sort list of radios; determining look angles; determining which look angle includes most radios in its main beam; determining a modified sort list and an initial move list for the determined look angle; determining a certain percentile of aggregate interference power spectral density at the new protection point for radios that are in a main beam for each of remaining look angles; sorting, by level of certain percentile of aggregate interference power spectral density, the remaining look angles; and generating a move list of radios.

DRAWINGS

DETAILED DESCRIPTION

Figure 1:
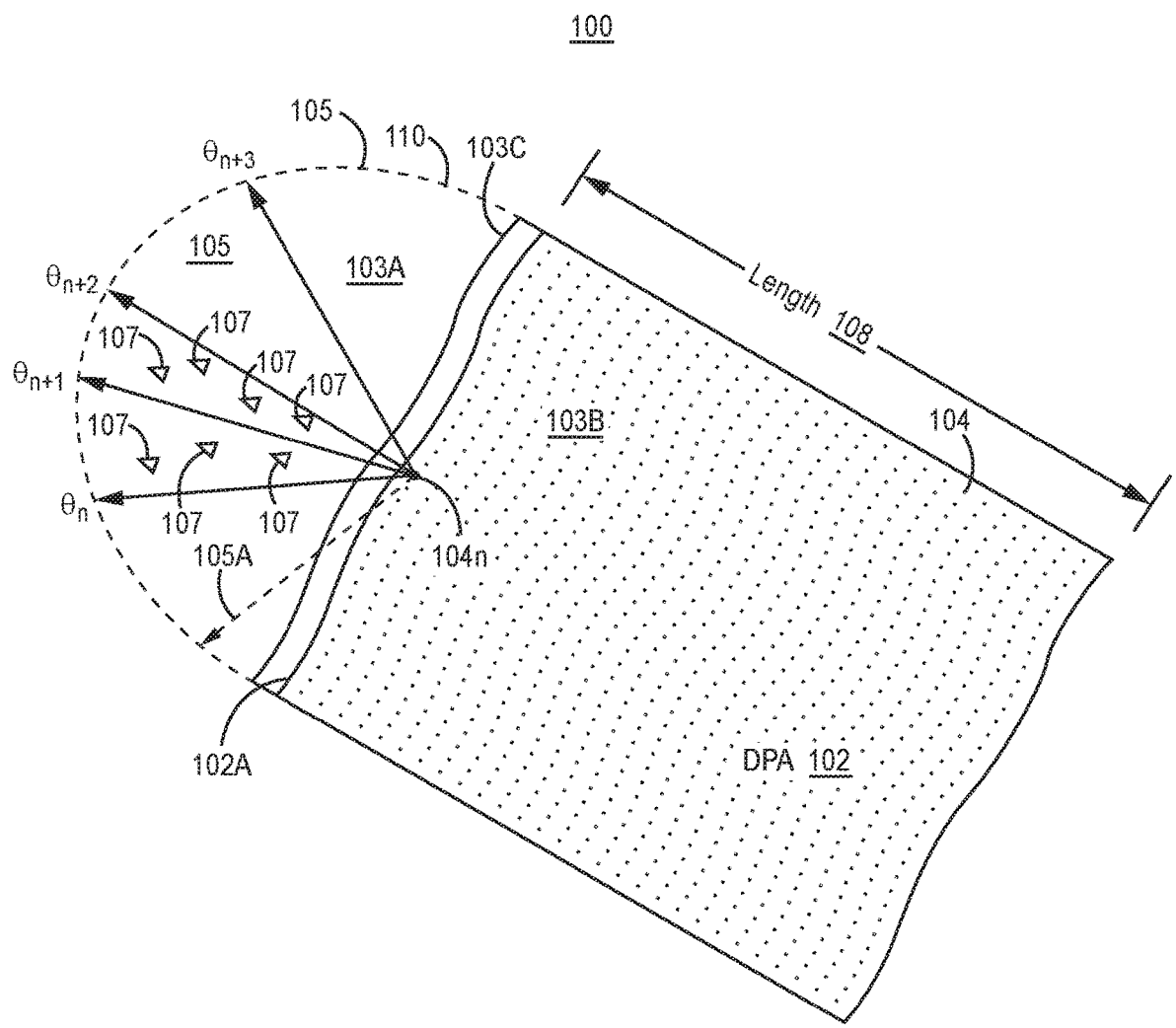
FIG. 1 illustrates one embodiment of a map with exemplary Citizens Broadband Radio Service Devices of a spectrum access system proximate to a dynamic protection area.

As will be subsequently further described, illustrated embodiments of the invention reduce the look angles for each protection point at which aggregate interference levels of radios in a spectrum access system must be calculated to ascertain which radios should cease operating (in a frequency band shared with a communications system(s) of incumbent user(s)) so that that maximum aggregate interference in the DPA is less than a threshold level of power spectral density. If the maximum aggregate interference in the DPA exceeds the threshold, the sensitivity of receiver(s) of an incumbent user(s)' communications system(s) in the DPA would be undesirably diminished, e.g. the reception range diminished. For example, if an incumbent user's communications system is radar, the range and minimum detectable radar cross section of the radar may be diminished. An incumbent user may also be referred to as a primary or primary user.

The invention is applicable to SASs for systems other than a CBRS and/or incumbent user(s) communications system(s) other than government communications systems such as radar. The invention is also applicable to incumbent user communications systems other than government operating a communications system, such as radar. However, for pedagogical reasons, the system will be subsequently illustrated as a CBRS, and the radios will be subsequently illustrated as CBSDs. Further, the government communications system can be any type of communications, such as land based radar. For pedagogical reasons, the government communications system shall be illustrated as a ship borne radar.

For pedagogical reasons, a SAS will now be briefly described in terms of a CBRS. CBSDs are part of a CBRS including a SAS which controls CBSD access to a frequency spectrum controlled by the SAS. In one embodiment, each CBSD is communicatively coupled to the SAS. The operational characteristics of each CBSD, such as operational frequency, transmit power, and channel bandwidth, are centrally controlled by the SAS. In one embodiment, user equipment, e.g. a portable device such as a handset, a phablet, a tablet or a laptop, wirelessly communicates with a CBSD using a portion of frequency spectrum controlled by the SAS and assigned to the CBSD.

The CBSDs comprise systems of Priority Access Licensees (PALs), and General Authorized Access (GAA) users. Systems of incumbent users, e.g. government communications systems, also operate in the spectrum regulated by the SAS.

Incumbent users have first, or highest, priority to utilize the frequency spectrum (or spectrum) controlled by the SAS. Thus, incumbent users shall be able to operate free of interference from other users, e.g. priority access licensees and general authorized access users. Free of interference as used herein does not mean an absence of interference, but rather means an acceptable level of interference which may be no interference or a finite level of interference. The acceptable level of interference may be defined by a power spectral density threshold. The acceptable level of interference may vary by geography, frequency spectrum, user type, license type, and/or other indicia. In one embodiment, the incumbent users include governmental communications systems, operators of fixed satellite communications systems, and grandfathered, prior licensees of the spectrum. Communications systems, as used herein, shall include radar systems (otherwise referred to herein as radar).

In one embodiment, priority access licensees have second, or intermediate, priority, after incumbent users, to utilize the frequency spectrum controlled by the SAS. In another embodiment, priority access licensees shall be able to operate, when not interfering with incumbent users, free of interference from other priority access licensees and general authorized access users. In a further embodiment, an ability of a PAL to operate free of interference shall be limited temporally, geographically, and spectrally by specifications in its license, e.g. from a government entity.

General authorized access users shall have third, or lowest, priority to utilize the frequency spectrum controlled by the SAS. In one embodiment, an operation of GAA users will be governed by rules pertaining to the SAS, e.g. governmental laws and regulations. For example, such rules shall only let GAA users operate when they do not interfere with incumbent users and PALs.

In one embodiment, the geographic coverage area and frequency spectrum controlled, at least in part, by the SAS may include exclusion zones and protection zones. CBSDs are prohibited from operating within exclusion zones.

The level of interference generated by CBSDs, e.g. by all non-incumbent users (PALs and GAA users), shall be limited in a protection zone, such as a DPA, so as not to interfere with certain incumbent users such as government communications systems, e.g. ship borne Naval radar. Each CBSD proximate to a DPA may only transmit in shared frequency spectrum with the permission of the SAS. The SAS evaluates when CBSDs proximate to a DPA can transmit based upon information as to whether incumbent user(s)' communication system(s) are active, e.g. commence reception and/or transmission, in the DPA. The SAS determines whether incumbent user(s)' communication system(s) are active in the DPA based upon information received from an environmental sensing capability (ESC) system, and/or directly from the incumbent user. In one embodiment, the ESC system is a system of receivers that detect transmissions (in the band controlled by the SAS) by incumbent user(s) communications system(s) and notifies the SAS of any such transmissions.

For each DPA proximate to the CBSDs of a SAS, the SAS determines which CBSDs whose transmissions must be terminated in the frequency spectrum shared by incumbent user(s)' communications system(s) when the at least one of the incumbent user(s)' communications system(s) in the DPA becomes active so that the aggregate interference at the incumbent user(s)' communications system(s) in the DPA are below a threshold value, e.g. a threshold power spectral density level. Optionally, CBSDs are deemed to be proximate to a DPA if they reside in neighborhood as subsequently described below.

The SAS makes the foregoing determination on an ongoing basis, periodically and/or aperiodically, because the CBSDs operating proximate to a DPA in the shared frequency spectrum varies over time. Transmission termination may include changing the transmission frequency of determined CBSDs so that their transmission frequency is no longer in the shared frequency spectrum, but is in another portion of the spectrum controlled by the SAS. Methods and systems for efficiently determining which CBSDs whose transmissions should be terminated will now be described.

FIG. 1 illustrates one embodiment of a map with exemplary CBSDs of a SAS proximate to a DPA (map) 100. The DPA may encompass land 103A and/or water 103B. The DPA 102 illustrated in FIG. 1 encompasses water 103B only, e.g. represented where radar on a Naval ship may be located. Such radar may be a SPN-43 radar. Radar may have a mechanically swept antenna with a main beam, e.g. azimuthally swept three hundred and sixty degrees, or a phased array antenna with one or more main beams electrically directed. The DPA 102 comprises an array of protection points (array) 104. By performing analysis at some or all of the protection points in the array 104, the SAS determines which of its CBSDs 107 must cease transmission in the shared frequency spectrum when an incumbent user's communication system operates in the DPA 102.

Optionally, the above-described determination is only performed on CBSDs 107 in a neighborhood 105 of each protection point for which analysis is conducted. The neighborhood 105 is defined by a neighborhood distance 105A, e.g. three hundred kilometers, from a corresponding protection point 104n. The aforementioned determination is only made for CBSDs 107 in neighborhoods of protection points where an analysis, as subsequently exemplified, is performed. Alternatively, a neighborhood can be a fixed region, independent of distance from any protection point. The neighborhood 105, e.g. neighborhood distance 105A, may be defined by a standards body or a government. The farther a protection point is from a shoreline 103C, the more likely that the corresponding neighborhood will have fewer CBSDs.

In FIG. 1, an exemplary, or new, protection point 104n is analyzed. Optionally, the dimensions of the DPA 102, and the number and spacing of protection points in the array 104, are determined by a government. Optionally, the length 108 (a distance in a direction substantially perpendicular to the average shoreline) of the DPA 102 is two hundred and fifty kilometers. Average shoreline means a mathematical representation of a shoreline formed by averaging perturbations in the shoreline so that the mathematical representation has a second derivative substantially equal to zero. Optionally, the border 102A of the DPA 102 substantially parallel to and proximate (or adjacent) to the average shoreline is spaced fifteen kilometers from the shore line or average shoreline. Optionally, the protection points in the array 104 are spaced 2 arc seconds from one another which corresponds to the distance or a multiple of distances between terrain data points in government (such as the U.S. Geological Survey) databases.

The map 100 illustrates look angles around the exemplary protection point 104n. Exemplary look angles included $\theta_n$, $\theta_{n+1}$, $\theta_{n+2}$, and $\theta_{n+3}$. Look angles of a protection point are discrete azimuthal angles around the protection point. Optionally, as illustrated in FIG. 1, the number of look angles around a protection point is equal to three hundred and sixty degrees divided by one half of the 3 dB beam width of the main beam of an antenna of the incumbent user's communication system. Thus, as illustrated in FIG. 1, the beam width of look angle $\theta_{n+1}$ extends from look angle $\theta_n$ to look angle $\theta_{n+2}$. However, the number of look angles can be determined in alternative ways, e.g. as specified by the CBRS or SAS designer, government, and/or standards body.

The main beam is defined by a beam width such as the 3 dB beam width. However, a different beam width other than a 3 dB beam width may be used.

An exemplary government communications system, the SPN-43 radar, has a 3 dB beam width of the main beam is three degrees. Thus, using the method described above, the number of look angles is two hundred and forty. Alternatively, using the same method, for other communications systems, the beam width, and thus the number of look angles, may differ.

Figure 2:
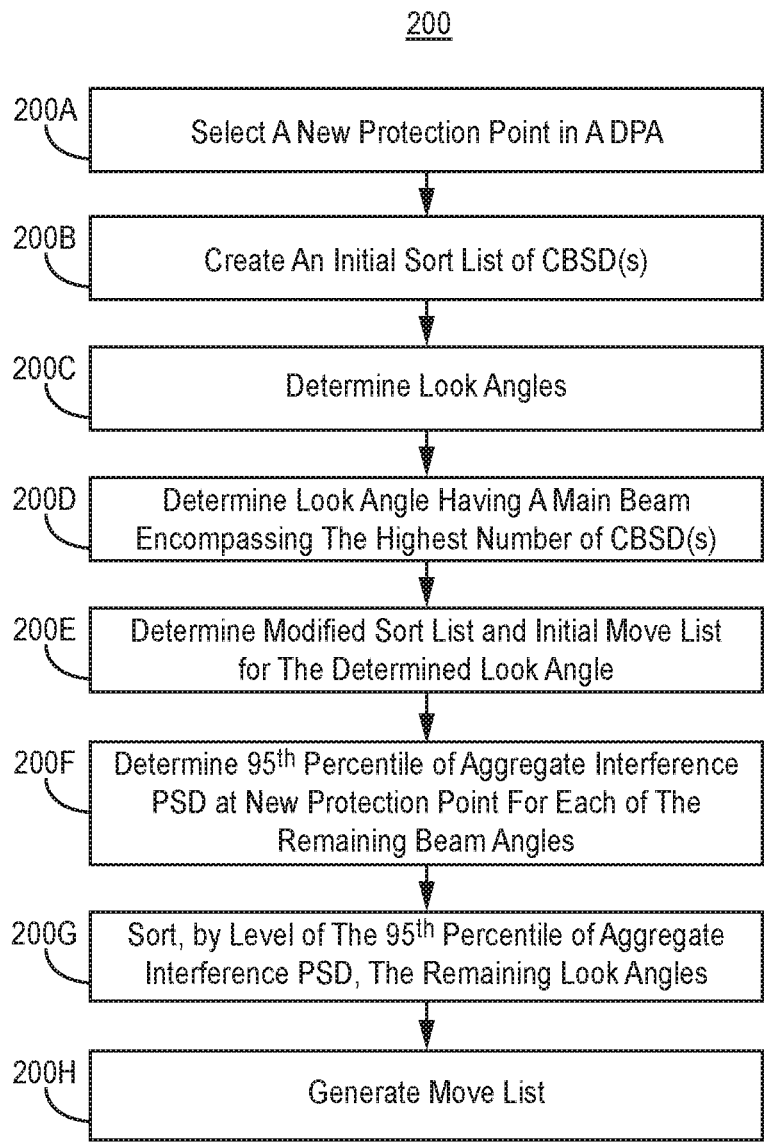
FIG. 2 illustrates one embodiment of a method of determining a move list of Citizens Broadband Radio Service Devices for a protection point.

FIG. 2 illustrates one embodiment of a method of determining a move list of CBSDs for a protection point 200. The move list of CBSDs for a protection point is a list of CBSDs, e.g. in a neighborhood of the protection point, whose transmission in the shared frequency spectrum should be terminated when an incumbent user's communications system operates. To the extent the method 200 shown in FIG. 2 is described herein as being implemented in the systems shown in FIG. 6, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 200A, select a new protection point in a DPA. In block 200B, create an initial sort list of CBSDs. Optionally, create the initial sort list by determining the median interference power spectral density of the CBSDs (that are in the neighborhood of the selected protection point) at the selected protection point. The median interference power spectral density for each CBSD is determined using transmit parameters, receive parameters, and a median path loss determined by an irregular terrain path loss model, e.g. Longley-Rice model.

The median interference power spectral density for each CBSD is determined using transmit parameters, receive parameters, and a median path loss determined by an irregular terrain path loss model, i.e. Longley-Rice model. An exemplary embodiment of block 200B is subsequently described.

In block 200C determine look angles. Optionally, determine look angles in which CBSDs, e.g. in the neighborhood, are within main beams of such look angles. The number of look angles is N+1. Optionally, determine the number of CBSDs encompassed by the beam width of each look angle.

In block 200D, determine a look angle having a main beam encompassing the highest number of CBSDs, e.g. in the neighborhood. Optionally, if not previously performed, determine the number of CBSDs encompassed by the beam width of each look angle; then determine a look angle whose beam width encompasses the greatest number of CBSDs.

In block 200E, determine an initial move list for the determined look angle. Based on the determined initial move list, generate a modified sort list. An exemplary embodiment of block 200E is subsequently described.

In block 200F, determine a $95^{th}$ percentile of aggregate interference power spectral density at the new protection point only for CBSDs that are in the main beam for each of the remaining look angles. The remaining look angles (or remaining look angles list) means the look angles determined in block 200C except for the look angle determined in block 200D. The $95^{th}$ percentile of aggregate interference power spectral density of each remaining look angle is determined, e.g. (a) as illustrated for $95^{th}$ percentileLogScale in U.S. provisional patent application entitled "Computing Statistics for Mixture Distributions" filed on May 16, 2018 and having Ser. No. 62/672,424 and (hereinafter referred to as the '424 Application) or (b) using Monte Carlo analysis as described in WInnForum Working Document WINNF-TS-0112 Version V1.2.0 (13 Jul. 2017). The '424 Application and the WInnForum Working Document WINNF-TS-0112 Version V1.2.0 (13 Jul. 2017) are each incorporated in their entirety by reference herein.

The WInnForum Working Document WINNF-TS-0112 Version V1.2.0 (13 Jul. 2017) describes a threshold of the $95^{th}$ percentile of aggregate interference power spectral density. However, other shared spectra systems may utilize embodiments of the invention with a different threshold, e.g. greater than or less than the $95^{th}$ percentile. The $95^{th}$ percentile of aggregate interference power spectral density is illustrated herein for pedagogical purposes only. The threshold may be generally referred to herein as a certain percentile.

Optionally, data about power spectral density of each CBSD, e.g. in the neighborhood of the new protection point, is obtained as follows. Transmission model(s) provide the effective radiated power spectral density (e.g. versus azimuthal angle) of each CBSD. Further, the radiated power spectral density of each CBSD at the new protection point is determined using an irregular terrain path loss model, i.e. Longley-Rice model.

In block 200G, sort, by the level of the $95^{th}$ percentile of aggregate interference power spectral density for CBSDs that are in the main beam of each look angle, the remaining M look angles, where M=N. For example, sort the remaining look angles from highest to lowest $95^{th}$ percentile of aggregate interference power spectral density, where $m^{th}$ remaining look angle, where m=1, has the highest level of the $95^{th}$ percentile of aggregate interference power spectral density, and where the m$^{th}$ remaining look angle, where m=M, has the lowest level of the 95th percentile of aggregate interference power spectral density.

In block 200H, generate a move list of CBSDs for the new protection point. The move list identifies the CBSDs whose transmissions in the shared frequency spectrum will be halted when incumbent user(s)' communications system(s) become active in a DPA proximate to such CBSDs. For purposes of clarity, the move list may include zero, one, or more than one CBSDs. An exemplary embodiment of how to implement block 200H is subsequently described.

Figure 3:
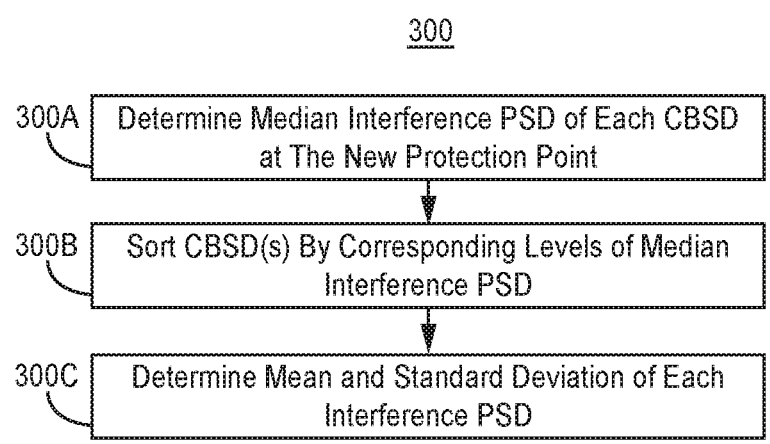
FIG. 3 illustrates one embodiment of a method of creating the initial sort list of Citizens Broadband Radio Service Devices.

FIG. 3 illustrates one embodiment of a method of creating the initial sort list of CBSDs 300. This illustrates one embodiment of how to implement block 200B; however, other techniques can be used to implement block 200B. To the extent that the method 300 shown in FIG. 3 is described herein as being implemented using the system shown in FIG. 6, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 300A, determine a median interference power spectral density of each CBSD at the new protection point. The median interference power spectral density is determined as describe above. In block 300B, sort the CBSDs by corresponding levels of median interference power spectral density, i.e. from highest to lowest median interference power spectral density; save the sorted CBSDs as the initial sort list; the CBSD at the top of the initial sort list has the highest median interference power and the CBSD at the bottom of the initial sort list has the lowest interference power. In block 300C, determine the mean and standard deviation of each interference power spectral density of each CBSD assuming a radar antenna gain of zero decibels, e.g. as illustrated for mixtureMean and mixtureStd in the '424 Application. The interference power spectral density may have a log normal distribution. The mean and standard deviation of interference power spectral density assuming a radar antenna gain of zero decibels may hereinafter be referred to as zero dB antenna gain mean of interference power spectral density and zero dB antenna gain standard deviation of interference power spectral density. Note, block 300C can be alternatively performed at a subsequent block in method 200, or in its own block in method 200.

Figure 4:
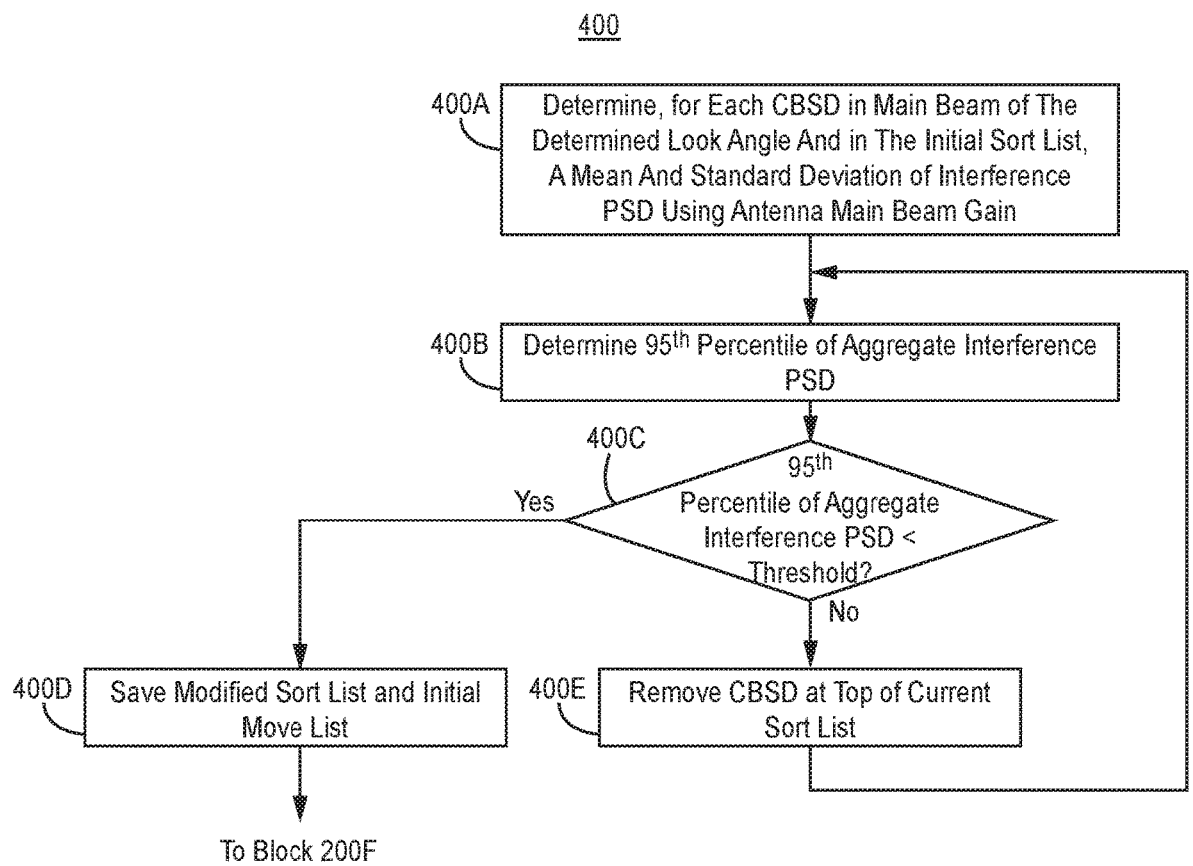
FIG. 4 illustrates one embodiment of a method of determining the $95^{th}$ percentile of aggregate interference power spectral density at the new protection point for each of the remaining look angles.

FIG. 4 illustrates one embodiment of a method of determining the 95$^{th}$ percentile of aggregate interference power spectral density at the new protection point for each of the remaining look angles 400. This illustrates one embodiment of how to implement block 200E; however, other techniques can be used to implement block 200E. To the extent the method 400 shown in FIG. 4 is described herein as being implemented using the system shown in FIG. 6, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 400A, for each CBSD in the main beam of the determined look angle (i.e. determined block 200D) and in the initial sort list, determine a mean and a standard deviation of the interference power spectral density utilizing antenna main beam gain of the radar receiver in the DPA. The mean of the interference power spectral density utilizing antenna main beam gain is equal to the mean of the interference power spectral density calculated in block 300C multiplied by the antenna main beam gain. The standard deviation of the interference power spectral density utilizing antenna main beam gain is equal to the standard deviation of the interference power spectral density calculated in block 300C multiplied by the radar antenna mean beam gain. The radar antenna mean beam gain is:

$$e^{\left(\frac{ln(10)}{10}\right)*Radar\ Antenna\ Main\ Beam\ Gain\ (in\ dB)} \qquad \text{(Equation 1)}$$

In one embodiment, the Radar Antenna Main Beam Gain is greater than zero decibels (dB), e.g. 25 dB.

In block 400B, determine the 95$^{th}$ percentile of the aggregate interference power spectral density at the new protection point using:

(a) for each CBSD in the main beam of the determined look angle and in the initial sort list, the mean and the standard deviation of the interference power spectral densities utilizing antenna main beam gain determined in block 400A; and (b) for the other CBSDs (outside of the main beam of the determined look angle) in the initial sort list, the mean and the standard deviation of the interference power spectral densities determined in block 300C.

In one embodiment, utilize one of the techniques described above with respect to block 200F to determine the 95$^{th}$ percentile of the aggregate interference power spectral density at the new protection point.

In block 400C determine if the determined 95$^{th}$ percentile of the aggregate interference power spectral density is below a threshold level, e.g. −144 dBm/10 MHz. If yes, then in block 400D save a modified sort list and an initial move list. The modified sort list is the initial sort list less any CBSDs removed by this method 400. The initial move list comprises the CBSDs removed from the initial sort list by this method 400. Then proceed to block 200F. If no, then in block 400E, remove a CBSD at the top of the current sort list. Then, return to block 400B. Optionally, method 400 can be made more efficient by replacing blocks 400B, 400C, and 400E with a binary search (otherwise known as a half interval search).

Figure 5:
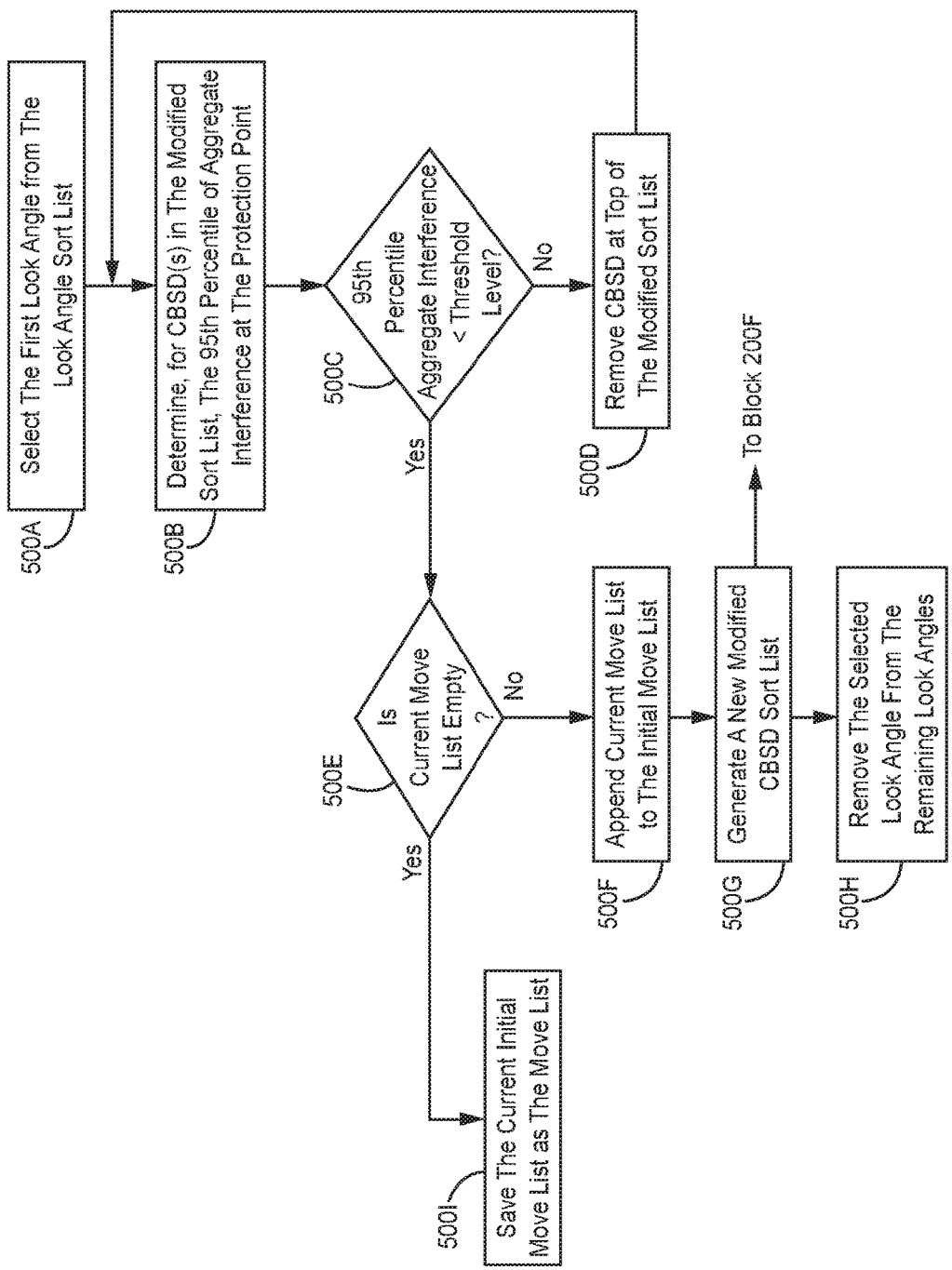
FIG. 5 illustrates one embodiment of a method of determining a $95^{th}$ percentile of aggregate interference power spectral density at the new protection point for each of the remaining look angles.

FIG. 5 illustrates one embodiment of a method of determining a 95$^{th}$ percentile of aggregate interference power spectral density at the new protection point for each of the remaining look angles 500. This illustrates one embodiment of how to implement block 200H; however, other techniques can be used to implement block 200H. To the extent the method 500 shown in FIG. 5 is described herein as being implemented using the system shown in FIG. 6, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 500A, select a first look angle in the sorted remaining look angles. The first look angle, with respect to all remaining look angles, has the highest 95th percentile of aggregate interference power spectral density (PSD) of CBSDs in the main beam of each look angle. In block 500B, determine for CBSD(s) in the modified sort list, the 95th percentile of the aggregate interference power spectral density at the protection point using the previously calculated mean and standard deviation of the interference power spectral densities utilizing antenna main beam gain, of the receiver in the dynamic protection area, for CBSDs in the main beam of the first look angle, and the previously calculated zero dB antenna gain mean and standard deviation of interference power spectral densities for CBSDs not in the main beam of the first look angle. For example, use the technique illustrated for mixtureMean and mixtureStd in the '424 Application.

In block 500C determine if the $95^{th}$ percentile of the aggregate interference power spectral density at the protection point is below a threshold level, e.g. −144 dBm/10 MHz. If no, then in block 500D remove the CBSD at the top of the modified sort list, and return to block 500B. If yes, then in block 500E determine if the current move list is empty; the current move list comprises the CBSD(s) removed in block 500D for a given look angle. If yes, then in block 500I save the current initial move list as the move list generated by block 200H. If no, then in block 500F append the current move list to the initial move list to create new initial move list (also referred to as the initial move list). The initial move list is dynamic and may change for each repetition of the method 500 of FIG. 5. Then in block 500G, generate a new modified CBSD sort list by removing the CBSD(s) in the current move list from the modified CBSD sort list. Then in block 500H, remove the selected look angle from the remaining look angles list. The remaining look angle list is dynamic and changes for each repetition of method 500 of FIG. 5. Then, proceed to block 200F.

Figure 6:
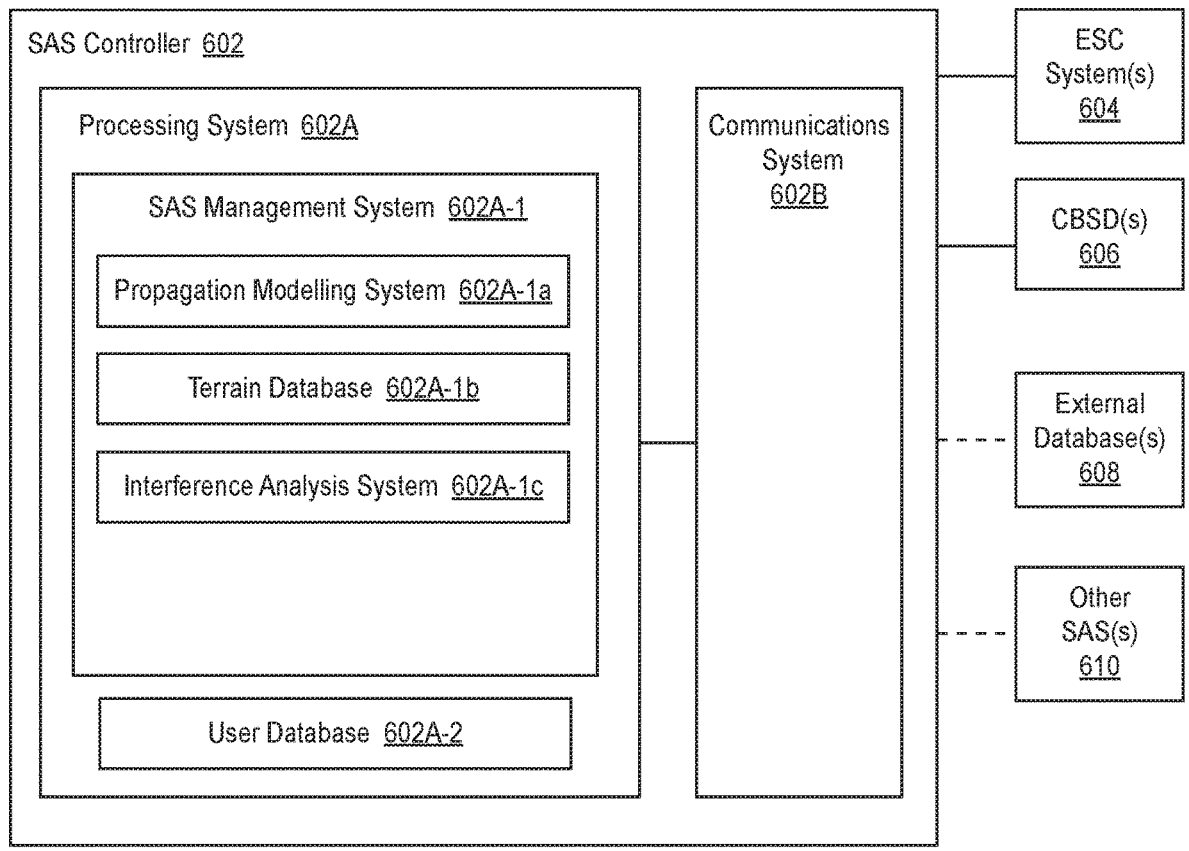
FIG. 6 illustrates an exemplary Citizens Broadband Radio Service.

The methods described herein can also be implemented in a shared access system such as a CBRS. FIG. 6 illustrates an exemplary SAS 600. The illustrated SAS 600 includes a SAS controller 602 coupled to at least one environmental sensing capability (ESC) system 604 and at least one CBSD (CBSD(s)) 606. Optionally, the SAS 600 is coupled to at least one external database (external database(s)) 608 and/or other SAS(s) 610. Each CBSD is operated by a GAA user and/or a PAL.

The external database(s) 608 may include without limitation: (a) databases, e.g. government databases (such as provided by the U.S. Federal Communications Commission), which store information about CBSD(s), priority access licensees (PALs), and/or incumbent users; and/or (b) databases, e.g. government databases (such as the U.S. Geological Survey), storing information about terrain and other obstructions (e.g. buildings) and geographic morphology. In one embodiment, external databases that store terrain information store elevation data and/or geographic morphology data substantially in a grid pattern, e.g. every 30 m or 50 m. In another embodiment, such data is geodesic map data.

The SAS 600 may be coupled to other SAS(s) 610, e.g. operating in the same or overlapping frequency spectrum. For example, such other SAS(s) 610 and their PALs, GAA users, and associated incumbent users may generate electromagnetic energy that overlaps the geographic region of the SAS 600, and thus must be accounted for by the SAS 600 when the SAS 600 performs interference analysis, e.g. as described above, and authorizes operation of CBSD(s) 606 of the PALs and/or the GAA users. If electromagnetic radiation of CBSDs of the SAS 600 and the other SAS(s) 610 overlap in a DPA, the SAS 600 may also have to account for the CBSDs of other SAS(s) 610 when determining a move list for protection points in the DPA. The move list may include CBSDs controlled by other SAS(s) 610. By communicatively coupling SASs that are geographically proximate to one another, each SAS can account for electromagnetic energy emitted from CBSD(s) of other SAS(s) proximate in geography.

The Environmental Sensing Capability (ESC) system 604 detects, and communicates to the SAS 600, the presence of signal(s), e.g. from incumbent user(s)'s communications system(s) such as a ship borne Naval radar. In one embodiment, the ESC system 604 comprises one or more receivers proximate to a DPA, e.g. disposed along a shoreline. The SAS controller 602 uses information from the ESC system 604, at least in part, to regulate the operation (e.g. power levels and frequencies of operation) of the CBSD(s) 606 to allow the incumbent user(s) to operate free of interference. Thus, for example, the CBSD(s) in the move list have their ability to transmit in the shared frequency spectrum during operation of the incumbent user terminated, e.g. their transmission frequencies may be shifted to other frequencies outside of the shared frequency spectrum.

The SAS controller 602 controls the operation (e.g. power levels and frequencies of operation) of the GAA user(s) so that the incumbent user(s) and PAL(s) operate free of interference. Further, the SAS controller 602 controls the operation e.g. power levels and frequencies of operation) of GAA user(s), e.g. so each GAA user operates free of interference.

In one embodiment, the SAS controller 602 includes a processing system 602A coupled to a communications system 602B. The processing system 602A controls the operation of CBSD(s) 606 that form part of the SAS 600. The processing system 602A may also be referred to herein as processing circuitry.

The communications system 602B facilitates communications between the SAS controller 602 and other systems or devices, e.g. CBSD(s) 606, the ESC system(s) 604, external database(s) 608, and/or other SAS(s) 610. In one embodiment, the communications system 602B is a data modem implemented with modem circuitry.

In the illustrated embodiment, the processing system 602A includes a SAS management system 602A-1 and a user database 602A-2. The user database 602A-2 includes information about geographic location, operating frequency spectrum, power output level of operation, modulation types, antenna radiation patterns, radiated power (or transmission) model(s), and/or maximum tolerable interference level of each CBSD included in the SAS 600. In one embodiment, the SAS management system 602A-1 includes a propagation modelling system 602A-1a, a terrain database 602A-1b, and an interference analysis system 102A-1c. Database as used herein means any data storage technique, including a conventional database, data files, and/or storage registers.

The interference analysis system 602A-1c performs the methods described above. The interference analysis system 602A-1c may utilize the propagation modelling system 602A-1a, the terrain database 602A-1b, and/or the user database 602A-2 to perform its functions.

The processing system 602A may be implemented by a state machine, e.g. processing circuitry coupled to memory circuitry, or a neural network. The processing circuitry may include one or more microprocessors, microcontrollers, digital signal processing (DSP) elements, application-specific integrated circuits (ASICs), and/or field programmable gate arrays (FPGAs). In this exemplary embodiment, processing circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuit can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk—Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium and executed by the processing circuitry. Generally, program modules or applications include routines, programs, objects, data components, data structures, algorithms, and the like, which perform particular tasks or implement particular abstract data types.

Databases as used herein may be either conventional databases or data storage formats of any type, e.g. data files. Although separate databases are recited herein, one or more of such databases may be combined.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a method, comprising: selecting a new protection point in a dynamic protection area; creating an initial sort list of radios; determining look angles; determining which look angle includes most radios in its main beam; determining a modified sort list and an initial move list for the determined look angle; determining a certain percentile of aggregate interference power spectral density at the new protection point for radios that are in a main beam for each of remaining look angles; sorting, by level of certain percentile of aggregate interference power spectral density, the remaining look angles; and generating a move list of radios.

Example 2 includes the method of Example 1, wherein determining the look angles comprises determining look angles having radios within main beams of such look angles.

Example 3 includes the method of any of Examples 1-2, further comprising determining a mean and a standard deviation of each interference power spectral density of each radio at the new protection point utilizing an antenna gain of zero decibels for the receiver in the dynamic protection area.

Example 4 includes the method of any of Examples 1-3, wherein determining the modified sort list and the initial move list for the determined look angle comprises: for each radio in the main beam of the determined look angle and in the initial sort list, determining a mean and a standard deviation of the interference utilizing an antenna main beam gain of the receiver in the dynamic protection area; determining the certain percentile of the aggregate interference power spectral density at the new protection point using: (a) for each radio in the main beam of the determined look angle and in the initial sort list, the mean and the standard deviation of the interferences utilizing an antenna main beam gain of the receiver in the dynamic protection area; and (b) for each radio in the initial sort list and not in the main beam of the determined look angle, the mean and the standard deviation of the interferences utilizing an antenna gain of zero decibels for the receiver in the dynamic protection area; determining if the determined certain percentile of the aggregate interference power spectral density is below a threshold level; if the determined certain percentile of the aggregate interference power spectral density is below the threshold level, then save the modified sort list and the initial move list; and if the determined certain percentile of the aggregate interference power spectral density is not below the threshold level, then removing a radio at the top of the current sort list.

Example 5 includes the method of any of Examples 1-4, wherein generating the move list of the radios comprises: selecting a first look angle in the sorted remaining look angles, where the first angle has the highest certain percentile of aggregate interference power spectral density of radios in the main beam of each look angle; for the selected look angle and for radios in the modified sort list, determining a certain percentile of aggregate interference power spectral density at the new protection point using mean and standard deviation of interference utilizing antenna main beam gain, of the receiver in the dynamic protection area, for radios in the main beam of the selected look angle, and zero dB antenna gain mean and standard deviation of interference power spectral density for radios not in the main beam of the selected look angle; determining if the determined certain percentile of the aggregate interference power spectral density is below a threshold level; if the determined certain percentile of the aggregate interference power spectral density is not below the threshold level, then remove a radio at the top of the modified sort list; if the determined certain percentile of the aggregate interference power spectral density is below the threshold level, then determining if a current move list is empty; if the current move list is empty, then saving the current initial move list as the move list; and if the current move list is not empty, then: creating a new initial move list by appending the current initial move list to the initial move list; generating a new modified sort list; and removing the selected look angle from the remaining look angles.

Example 6 includes the method of any of Examples 1-5, wherein creating an initial sort list of radios comprises selecting radios within a neighborhood distance from the new protection point.

Example 7 includes any of examples 1-6, method of claim 1, wherein the certain percentile is a $95^{th}$ percentile.

Example 8 includes a non-transitory computer readable medium storing a program causing a computer to perform a method, the method comprising: selecting a new protection point in a dynamic protection area; creating an initial sort list of radios; determining look angles; determining which look angle includes most radios in its main beam; determining a modified sort list and an initial move list for the determined look angle; determining a certain percentile of aggregate interference power spectral density at the new protection point for radios that are in a main beam for each of remaining look angles; sorting, by level of certain percentile of aggregate interference power spectral density, the remaining look angles; and generating a move list of radios.

Example 9 includes the non-transitory computer readable medium of Example 8, wherein determining the look angles comprises determining look angles having radios within main beams of such look angles.

Example 10 includes the non-transitory computer readable medium of any of Examples 8-9, further comprising determining a mean and a standard deviation of each interference power spectral density of each radio at the new protection point utilizing an antenna gain of zero decibels for the receiver in the dynamic protection area.

Example 11 includes the non-transitory computer readable medium of any of Examples 8-10, wherein determining the modified sort list and the initial move list for the determined look angle comprises: for each radio in the main beam of the determined look angle and in the initial sort list, determining a mean and a standard deviation of the interference utilizing an antenna main beam gain of the receiver in the dynamic protection area; determining the certain percentile of the aggregate interference power spectral density at the new protection point using: (a) for each radio in the main beam of the determined look angle and in the initial sort list, the mean and the standard deviation of the interferences utilizing an antenna main beam gain of the receiver in the dynamic protection area; and (b) for each radio in the initial sort list and not in the main beam of the determined look angle, the mean and the standard deviation of the interferences utilizing an antenna gain of zero for the receiver in the dynamic protection area; determining if the determined certain percentile of the aggregate interference power spectral density is below a threshold level; if the determined certain percentile of the aggregate interference power spectral density is below the threshold level, then save the modified sort list and the initial move list; and if the determined certain percentile of the aggregate interference power spectral density is not below the threshold level, then removing a radio at the top of the current sort list.

Example 12 includes the non-transitory computer readable medium of any of Examples 8-11, wherein generating the move list of the radios comprises: selecting a first look angle in the sorted remaining look angles, where the first angle has the highest certain percentile of aggregate interference power spectral density of radios in the main beam of each look angle; for the selected look angle and for radios in the modified sort list, determining a certain percentile of aggregate interference power spectral density at the new protection point using mean and standard deviation of interference utilizing antenna main beam gain, of the receiver in the dynamic protection area, for radios in the main beam of the selected look angle, and zero decibel antenna gain mean and standard deviation of interference power spectral density for radios not in the main beam of the selected look angle; determining if the determined certain percentile of the aggregate interference power spectral density is below a threshold level; if the determined certain percentile of the aggregate interference power spectral density is not below the threshold level, then remove a radio at the top of the modified sort list; if the determined certain percentile of the aggregate interference power spectral density is below the threshold level, then determining if a current move list is empty; if the current move list is empty, then saving the current initial move list as the move list; and if the current move list is not empty, then: creating a new initial move list by appending the current initial move list to the initial move list; generating a new modified sort list; and removing the selected look angle from the remaining look angles.

Example 13 includes the non-transitory computer readable medium of any of Examples 8-12, wherein creating an initial sort list of radios comprises selecting radios within a neighborhood distance from the new protection point.

Example 14 includes a system, comprising: a spectrum access system comprising processing circuitry coupled to a communications system; wherein the processing circuitry is configured to: select a new protection point in a dynamic protection area; create an initial sort list of radios; determine look angles; determine which look angle includes most radios in its main beam; determine a modified sort list and an initial move list for the determined look angle; determine a certain percentile of aggregate interference power spectral density at the new protection point for radios that are in a main beam for each of remaining look angles; sort, by level of certain percentile of aggregate interference power spectral density, the remaining look angles; and generate a move list of radios.

Example 15 includes the system of Example 14, wherein the certain percentile is a $95^{th}$ percentile.

Example 16 includes the system of Example 14, wherein determine the look angles comprises determine look angles having radios within main beams of such look angles.

Example 17 includes the system of any of Examples 14-16, wherein the processing circuitry is further configured to determine a mean and a standard deviation of each interference power spectral density of each radio at the new protection point utilizing an antenna gain of zero decibels for the receiver in the dynamic protection area.

Example 18 includes the system of any of Examples 14-17, wherein determine the modified sort list and the initial move list for the determined look angle comprises: for each radio in the main beam of the determined look angle and in the initial sort list, determine a mean and a standard deviation of the interference utilizing an antenna main beam gain of the receiver in the dynamic protection area; determine the certain percentile of the aggregate interference power spectral density at the new protection point using: (a) for each radio in the main beam of the determined look angle and in the initial sort list, the mean and the standard deviation of the interferences utilizing an antenna main beam gain of the receiver in the dynamic protection area; and (b) for each radio in the initial sort list and not in the main beam of the determined look angle, the mean and the standard deviation of the interferences utilizing an antenna gain of zero decibel for the receiver in the dynamic protection area; determine if the determined certain percentile of the aggregate interference power spectral density is below a threshold level; if the determined certain percentile of the aggregate interference power spectral density is below the threshold level, then save the modified sort list and the initial move list; and if the determined certain percentile of the aggregate interference power spectral is not below the threshold level, then removing a radio at the top of the current sort list.

Example 19 includes the system of any of Examples 14-18, wherein generate the move list of the radios comprises: select a first look angle in the sorted remaining look angles, where the first angle has the highest certain percentile of aggregate interference power spectral density of radios in the main beam of each look angle; for the selected look angle and for radios in the modified sort list, determine a certain percentile of aggregate interference power spectral density at the new protection point using mean and standard deviation of interference utilizing antenna main beam gain, of the receiver in the dynamic protection area, for radios in the main beam of the selected look angle, and zero decibel antenna gain mean and standard deviation of interference power spectral density for radios not in the main beam of the selected look angle; determine if the determined certain percentile of the aggregate interference power spectral density is below a threshold level; if the determined certain percentile of the aggregate interference power spectral density is not below the threshold level, then remove a radio at the top of the modified sort list; if the determined certain percentile of the aggregate interference power spectral density is below the threshold level, then determine if a current move list is empty; if the current move list is empty, then save the current initial move list as the move list; and if the current move list is not empty, then: create a new initial move list by appending the current initial move list to the initial move list; generate a new modified sort list; and remove the selected look angle from the remaining look angles.

Example 20 includes the system of Example 14, wherein the certain percentile is a $95^{th}$ percentile.

Example 21 includes the system of any of Examples 14-20, wherein create an initial sort list of radios comprises select radios within a neighborhood distance from the new protection point.

Example 22 includes the s system of any of Examples 14-21, wherein the processing circuitry comprises a shared access system management system and a user database.

Example 23 includes the system of any of Examples 14-22, wherein at least one of an environmental sensing capability system, at least one external database, and at least one other spectrum access system are coupled to the communications system.

The invention claimed is:
1. A method, comprising:
  selecting a new protection point in a dynamic protection area;
  creating an initial sort list of radios;
  determining look angles around the new protection point;
  determining which look angle includes most radios in a main beam, of an antenna radiation pattern, in the look angle;
  determining a modified sort list and an initial move list for the determined look angle;
  determining a certain percentile of aggregate interference power spectral density at the new protection point for radios that are in a main beam in each of remaining look angles;
  sorting, by level of the certain percentile of aggregate interference power spectral density, the remaining look angles; and
  generating a move list of radios.
2. The method of claim 1, wherein determining the look angles around the new protection point comprises determining look angles around the new protection point having radios within a main beam, of a radiation pattern, in each of such look angles.
3. The method of claim 1, further comprising determining a mean and a standard deviation of each interference power spectral density of each radio at the new protection point utilizing an antenna gain of zero decibels for a receiver in the dynamic protection area.
4. The method of claim 1, wherein determining the modified sort list and the initial move list for the determined look angle comprises:
  for each radio in the main beam of the determined look angle and in the initial sort list, determining a mean and a standard deviation of an interference power spectral density utilizing an antenna main beam gain of a receiver in the dynamic protection area;
  determining the certain percentile of the aggregate interference power spectral density at the new protection point using:
    (a) for each radio in the main beam of the determined look angle and in the initial sort list, the mean and the standard deviation of the interference power spectral density utilizing an antenna main beam gain of the receiver in the dynamic protection area; and
    (b) for each radio in the initial sort list and not in the main beam of the determined look angle, the mean and the standard deviation of the interference power spectral density utilizing an antenna gain of zero decibels for the receiver in the dynamic protection area;
  determining if the determined certain percentile of the aggregate interference power spectral density is below a threshold level;
  if the determined certain percentile of the aggregate interference power spectral density is below the threshold level, then save the modified sort list and the initial move list; and
  if the determined certain percentile of the aggregate interference power spectral density is not below the threshold level, then removing a radio at a top of a current sort list.
5. The method of claim 1, wherein generating the move list of the radios comprises:
  selecting a first look angle in sorted remaining look angles, where the first angle has a highest certain percentile of aggregate interference power spectral density of radios in the main beam of each look angle;
  for the selected first look angle and for radios in the modified sort list, determining a certain percentile of aggregate interference power spectral density at the new protection point using mean and standard deviation of interference power spectral density utilizing antenna main beam gain, of a receiver in the dynamic protection area, for radios in the main beam of the selected first look angle, and zero dB antenna gain mean and standard deviation of interference power spectral density for radios not in the main beam of the selected first look angle;
  determining if the determined certain percentile of the aggregate interference power spectral density is below a threshold level;
  if the determined certain percentile of the aggregate interference power spectral density is not below the threshold level, then remove a radio at a top of the modified sort list;
  if the determined certain percentile of the aggregate interference power spectral density is below the threshold level, then determining if a current move list is empty;
  if the current move list is empty, then saving a current initial move list as the move list; and
  if the current move list is not empty, then:

creating a new initial move list by appending the current initial move list to the initial move list;
generating a new modified sort list; and
removing the selected first look angle from the sorted remaining look angles.

6. The method of claim 1, wherein creating an initial sort list of radios comprises selecting radios within a neighborhood distance from the new protection point.

7. The method of claim 1, wherein the certain percentile is a $95^{th}$ percentile.

8. A non-transitory computer readable medium storing a program causing a computer to perform a method, the method comprising:
selecting a new protection point in a dynamic protection area;
creating an initial sort list of radios;
determining look angles around the new protection point;
determining which look angle includes most radios in a main beam, of an antenna radiation pattern, in the look angle;
determining a modified sort list and an initial move list for the determined look angle;
determining a certain percentile of aggregate interference power spectral density at the new protection point for radios that are in a main beam in each remaining look angle;
sorting, by level of certain percentile of aggregate interference power spectral density, the remaining look angles; and
generating a move list of radios.

9. The non-transitory computer readable medium of claim 8, wherein determining the look angles around the new protection point comprises determining look angles around the new protection point having radios within a main beam, of a radiation pattern, in each of such look angles.

10. The non-transitory computer readable medium of claim 8, wherein the certain percentile is a $95^{th}$ percentile.

11. The non-transitory computer readable medium of claim 8, further comprising determining a mean and a standard deviation of each interference power spectral density of each radio at the new protection point utilizing an antenna gain of zero decibels for a receiver in the dynamic protection area.

12. The non-transitory computer readable medium of claim 8, wherein determining the modified sort list and the initial move list for the determined look angle comprises:
for each radio in the main beam of the determined look angle and in the initial sort list, determining a mean and a standard deviation of an interference power spectral density utilizing an antenna main beam gain of a receiver in the dynamic protection area;
determining the certain percentile of the aggregate interference power spectral density at the new protection point using:
(a) for each radio in the main beam of the determined look angle and in the initial sort list, the mean and the standard deviation of the interference power spectral density utilizing an antenna main beam gain of the receiver in the dynamic protection area; and
(b) for each radio in the initial sort list and not in the main beam of the determined look angle, the mean and the standard deviation of the interference power spectral density utilizing an antenna gain of zero for the receiver in the dynamic protection area;
determining if the determined certain percentile of the aggregate interference power spectral density is below a threshold level;
if the determined certain percentile of the aggregate interference power spectral density is below the threshold level, then save the modified sort list and the initial move list; and
if the determined certain percentile of the aggregate interference power spectral density is not below the threshold level, then removing a radio at a top of a current sort list.

13. The non-transitory computer readable medium of claim 8, wherein generating the move list of the radios comprises:
selecting a first look angle in sorted remaining look angles, where the first angle has a highest certain percentile of aggregate interference power spectral density of radios in the main beam of each look angle;
for the selected first look angle and for radios in the modified sort list, determining a certain percentile of aggregate interference power spectral density at the new protection point using mean and standard deviation of interference power spectral density utilizing antenna main beam gain, of a receiver in the dynamic protection area, for radios in the main beam of the selected first look angle, and zero decibel antenna gain mean and standard deviation of interference power spectral density for radios not in the main beam of the selected first look angle;
determining if the determined certain percentile of the aggregate interference power spectral density is below a threshold level;
if the determined certain percentile of the aggregate interference power spectral density is not below the threshold level, then remove a radio at a top of the modified sort list;
if the determined certain percentile of the aggregate interference power spectral density is below the threshold level, then determining if a current move list is empty;
if the current move list is empty, then saving a current initial move list as the move list; and
if the current move list is not empty, then:
creating a new initial move list by appending the current initial move list to the initial move list;
generating a new modified sort list; and
removing the selected first look angle from the sorted remaining look angles.

14. The non-transitory computer readable medium of claim 8, wherein creating an initial sort list of radios comprises selecting radios within a neighborhood distance from the new protection point.

15. A system, comprising:
a spectrum access system comprising processing circuitry coupled to a communications system;
at least one radio coupled to the communications system;
wherein the processing circuitry is configured to:
select a new protection point in a dynamic protection area;
create an initial sort list of radios;
determine look angles around the new protection point;
determine which look angle includes most radios in a main beam, of an antenna radiation pattern, in the look angle;
determine a modified sort list and an initial move list for the determined look angle;
determine a certain percentile of aggregate interference power spectral density at the new protection point for radios that are in a main beam in each remaining look angle;

sort, by level of certain percentile of aggregate interference power spectral density, the remaining look angles; and
generate a move list of radios.

16. The system of claim 15, wherein the certain percentile is a 95$^{th}$ percentile.

17. The system of claim 15, wherein determine the look angles around the new protection point comprises determine look angles around the new protection point having radios within a main beam of a radiation pattern, in each of such look angles.

18. The system of claim 15, wherein the processing circuitry is further configured to determine a mean and a standard deviation of each interference power spectral density of each radio at the new protection point utilizing an antenna gain of zero decibels for a receiver in the dynamic protection area.

19. The system of claim 15, wherein determine the modified sort list and the initial move list for the determined look angle comprises:
for each radio in the main beam of the determined look angle and in the initial sort list, determine a mean and a standard deviation of an interference power spectral density utilizing an antenna main beam gain of a receiver in the dynamic protection area;
determine the certain percentile of the aggregate interference power spectral density at the new protection point using:
  (a) for each radio in the main beam of the determined look angle and in the initial sort list, the mean and the standard deviation of the interference power spectral density utilizing an antenna main beam gain of the receiver in the dynamic protection area; and
  (b) for each radio in the initial sort list and not in the main beam of the determined look angle, the mean and the standard deviation of the interference power spectral density utilizing an antenna gain of zero decibel for the receiver in the dynamic protection area;
determine if the determined certain percentile of the aggregate interference power spectral density is below a threshold level;
if the determined certain percentile of the aggregate interference power spectral density is below the threshold level, then save the modified sort list and the initial move list; and
if the determined certain percentile of the aggregate interference power spectral is not below the threshold level, then removing a radio at a top of a current sort list.

20. The system of claim 15, wherein generate the move list of the radios comprises:
select a first look angle in sorted remaining look angles, where the first angle has a highest certain percentile of aggregate interference power spectral density of radios in the main beam of each look angle;
for the selected first look angle and for radios in the modified sort list, determine a certain percentile of aggregate interference power spectral density at the new protection point using mean and standard deviation of interference power spectral density utilizing antenna main beam gain, of a receiver in the dynamic protection area, for radios in the main beam of the selected first look angle, and zero decibel antenna gain mean and standard deviation of interference power spectral density for radios not in the main beam of the selected first look angle;
determine if the determined certain percentile of the aggregate interference power spectral density is below a threshold level;
if the determined certain percentile of the aggregate interference power spectral density is not below the threshold level, then remove a radio at a top of the modified sort list;
if the determined certain percentile of the aggregate interference power spectral density is below the threshold level, then determine if a current move list is empty;
if the current move list is empty, then save a current initial move list as the move list; and
if the current move list is not empty, then:
create a new initial move list by appending the current initial move list to the initial move list;
generate a new modified sort list; and
remove the selected first look angle from the sorted remaining look angles.

21. The system of claim 15, wherein create an initial sort list of radios comprises select radios within a neighborhood distance from the new protection point.

22. The system of claim 15, wherein the processing circuitry comprises a shared access system management system and a user database.

23. The system of claim 15, wherein at least one of an environmental sensing capability system, at least one external database, and at least one other spectrum access system is coupled to the communications system.

* * * * *